United States Patent [19]

Wagensonner et al.

[11] Patent Number: 5,162,645
[45] Date of Patent: Nov. 10, 1992

[54] PHOTOGRAPHIC SCANNER WITH REDUCED SUSCEPTIBILITY TO SCATTERING

[75] Inventors: Eduard Wagensonner, Aschheim; Wolfgang Ruf; Friedrich Jacob, both of Munich, all of Fed. Rep. of Germany

[73] Assignee: AGFA-Gevaert Aktiengesellschaft, Leverkusen, Fed. Rep. of Germany

[21] Appl. No.: 639,837

[22] Filed: Jan. 9, 1991

[30] Foreign Application Priority Data

Feb. 16, 1990 [DE] Fed. Rep. of Germany ....... 4004942

[51] Int. Cl.$^5$ .......................... H01J 40/14; H04N 1/10
[52] U.S. Cl. .............................. 250/208.1; 250/237 R
[58] Field of Search .................... 250/208.1, 237 R; 358/482, 483, 487, 494, 495, 496, 497

[56] References Cited

U.S. PATENT DOCUMENTS

| | | | |
|---|---|---|---|
| 3,548,195 | 12/1970 | Dhir et al. | 358/496 |
| 3,697,758 | 10/1972 | Binks | 250/237 R |
| 4,153,821 | 5/1979 | Baer | 250/237 R |
| 4,176,964 | 12/1979 | Knör et al. | 250/237 R |
| 4,531,062 | 7/1985 | Engemann et al. | 250/237 R |
| 4,651,226 | 3/1987 | Motoori et al. | 358/497 |
| 4,682,235 | 7/1987 | Chism, Jr. | 250/208.1 |
| 4,746,793 | 5/1988 | Hopkins, II | 250/237 R |
| 4,959,541 | 9/1990 | Boyd | 250/208.1 |

Primary Examiner—David C. Nelms
Assistant Examiner—John R. Lee
Attorney, Agent, or Firm—Peter K. Kontler

[57] ABSTRACT

A photographic scanner has a light source for illuminating a photographic original to be scanned and a sensor for detecting light which has passed through the original. The sensor has a single row of sensing cells, and the original is scanned by moving the sensor and the original relative to one another in a direction perpendicular to the row. An objective serves to focus light from the original on the sensing cells. Between the objective and the sensor is a protective glass sheet which overlies the sensor. A mask is interposed between the protective sheet and the sensor and has a slit in register with the row of sensing cells. The mask reduces the amount of scattered light reaching the sensing cells.

19 Claims, 5 Drawing Sheets

PRIOR ART

PHOTOGRAPHIC SCANNER WITH REDUCED SUSCEPTIBILITY TO SCATTERING

BACKGROUND OF THE INVENTION

The invention relates generally to a scanner for producing an image of an original, e.g., a photographic negative or diapositive.

More particularly, the invention relates to an electronic scanner having a sensor with a single row of sensing elements which function to sense the light from an illuminated original. The original is scanned by moving the sensor and the original relative to one another.

The general arrangement of prior art scanners is shown in the exploded view of FIG. 1 where the reference numeral 2 identifies an original to be scanned. The original 2 is illuminated by a light beam 1 and the light which passes through the original 2 is sent to a sensor 4 having a single row of sensing elements. An objective 3 serves to focus the light on the sensor 4. The original 2 is flat and, in order to scan the latter, the sensor 4 is moved in a direction perpendicular to the row of sensing elements as indicated by the double-headed arrow 5. The sensing elements then traverse the original 2 so as to scan successive increments of the original 2 at a multiplicity of points defining a series of rows and columns. Instead of moving the sensor 4 relative to the original 2, the original 2 can be moved relative to the sensor 4 so that the increment of the original 2 focused on the sensor 4 always passes through the optic axis.

As illustrated in FIG. 2, a protective sheet 7 of glass overlies the sensor 4 in selected models of prior art scanners. If a video signal of high quality is to be obtained during scanning, the characteristics of the sensor 4 must be such that the contrast in the video signal is as great as that in the original 2, e.g., three density gradations which is equivalent to a noise-to-signal ratio of 1:1000 in the video signal. Scattered light in the light path plays a very significant role here. FIG. 2 shows a group of light rays 6 which impinge upon the protective sheet 7 of the sensor 4 at the location A of FIG. 1. The protective sheet 7 produces scattered light, indicated by the arrows 8, 9, 10 and 11, as the rays 6 enter and leave the protective sheet 7. The scattered light impinges upon the sensor 4 at locations which are not illuminated by the rays 6 and thus reduces the contrast in the video signal. Furthermore, since the surface of the sensor 4 is reflective as a result of the chip manufacturing technique used for the sensor 4, the sensor 4 reflects light to the protective sheet 7 as shown, for example, by the arrows 12 and 13. The protective sheet 7, in turn, reflects this light back to the sensor 4 as indicated by the arrows 14 and 15 thereby generating additional scattered light.

At a boundary of high contrast between light and dark regions, the scattered light introduces a base signal of predetermined magnitude into the video signal of the line being scanned and also produces a halo about the edges of the boundary. Accordingly, it is not possible to achieve an abrupt change in signal such as, for instance, at a boundary of high contrast between light and dark regions.

FIG. 3 is a graphical representation of the video signal obtained with an arrangement of the type illustrated in FIG. 2. The position of the scanned column is plotted on the abscissa of FIG. 3 while the logarithm of the output voltage of the sensor 4 is plotted on the ordinate. The range of the ordinate is from log output voltage=0 to log output voltage=3 which corresponds to a variation of three decimal places in the output voltage. The portion of the output voltage responsible for the halo at the light-dark boundary is clearly seen at 16. The base signal which is due to the scattered light impinging upon the sensor 4 and contains electronic noise signals is indicated at 17. The ideal video signal is shown by broken lines 18.

SUMMARY OF THE INVENTION

It is an object of the invention to provide a scanner which allows the effect of scattered light to be reduced.

Another object of the invention is to provide a method which makes it possible to reduce the effect of scattered light on a scanning operation.

The preceding objects, as well as others which will become apparent as the description proceeds, are achieved by the invention.

One aspect of the invention resides in a scanner, particularly an electronic scanner, for producing an image of an original, e.g., a photographic negative or diapositive, located in a predetermined path. The scanner comprises a source of radiation and means for directing radiation from the source along the predetermined path. The directing means includes a lens for focusing radiation which travels away from the original. The scanner further comprises a sensor which includes a row of sensing elements arranged to sense the focused radiation and to generate signals which represent an image of the original. A mask for reducing impingement of scattered radiation on the sensing elements is located between the lens and the sensor. The mask is provided with a slit which extends longitudinally of, and is at least approximately in register with, the row of sensing elements, and the mask is positioned and designed to reduce vignetting of the image.

A protective sheet transparent to the radiation from the radiation source may be situated between the lens and the mask. This protective sheet is preferably made of glass.

The scanner may further comprise means for moving the original and the sensor relative to one another. Electronic circuitry associated with the sensor may also constitute part of the scanner.

The mask may have a pair of opposed major sides and the slit may bridge these sides. The slit may be designed so as to have a minimum area at one of the major sides and such side is then preferably juxtaposed with the sensor.

Except for scattered radiation which travels directly through the very narrow slit of the slotted mask according to the invention, the mask prevents scattered radiation, such as the scattered light produced at 8, 9, 10 and 11 in FIG. 2 upon passage of the rays 6 through the protective sheet 7, from impinging upon the sensor 4. Furthermore, the mask virtually eliminates the reflection of radiation which would normally impinge upon areas of the sensor 4 outside of the region thereof which is sensitive to radiation because essentially no radiation can travel to these areas. Thus, the mask absorbs radiation travelling towards such areas. In turn, radiation reflected back to the sensor 4 from surfaces facing the sensor 4, e.g., the reflected light 14 and 15 generated at the underside of the protective sheet 7 of FIG. 2, is virtually eliminated.

The mask may be provided with one or more matte black surfaces. It is preferred for the surfaces which bound the slit and for the surface which faces the sensor to be matte black. Blackening of reflecting surfaces of the mask, and especially reflecting surfaces at the sides of the slit, results in good absorption of interfering scattered radiation.

The slit may have a cross section such that the area of the slit decreases in a direction from one of the major surfaces of the mask towards the other major surface. The latter major surface is then preferably juxtaposed with the sensor. According to one embodiment of the invention, the cross section of the slit is trapezoidal because this permits good adjustment of the slit to the configuration of the incoming group of rays and allows the slit to be relatively narrow.

The slit may be flanked by a pair of opposed longitudinal walls and, in accordance with another embodiment of the invention, one or both of these walls is stepped so that the area of the slit decreases in a direction from the one major surface towards the other. Radiation which enters the slit but does not contribute to the formation of an image of the original is especially well absorbed by the steps.

The protective sheet may be inclined with respect to the predetermined path of the radiation, preferably at an angle of at least 10 degrees. An inclined orientation of the protective sheet has the advantage that radiation reflected from the surface of the sensor back to the protective sheet is reflected laterally by the latter so that it cannot again travel to the sensor via the slotted mask.

A spacer may be disposed between the protective sheet and the mask. The spacer, which is preferably constituted by a tubular element, advantageously has a length which is significantly greater than, e.g., is a multiple of, the distance between the mask and the sensor. By thus increasing the spacing between the protective sheet and the mask, the intensity of the scattered radiation is greatly reduced before arrival at the mask so that even less scattered light passes through the slit in the mask.

The novel features which are considered as characteristic of the invention are set forth in particular in the appended claims. The improved scanner itself, however, both as to its construction and its mode of operation, together with additional features and advantages thereof, will be best understood upon perusal of the following detailed description of certain specific embodiments when read in conjunction with the accompanying drawings.

DESCRIPTION OF THE PREFERRED EMBODIMENTS

Figure 1:
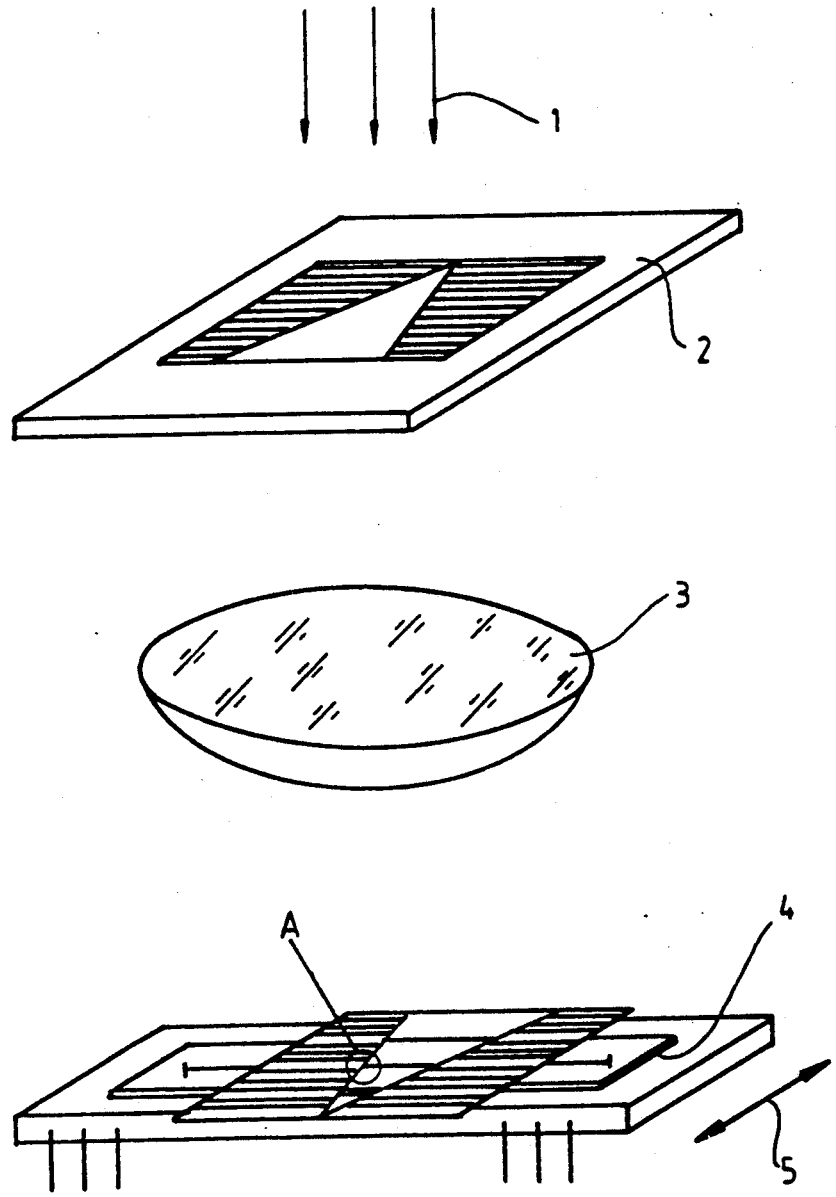
FIG. 1 is an exploded view showing the general arrangement of a prior art scanner.
Figure 2:
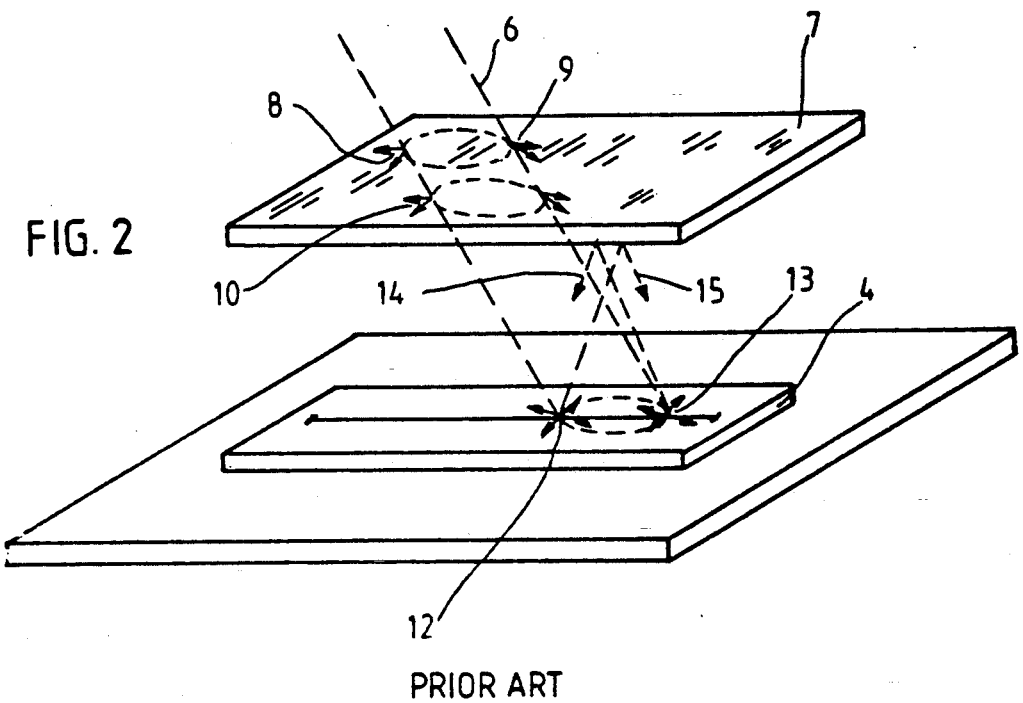
FIG. 2 illustrates the scattering which occurs in a prior art scanner of the type having a protective glass sheet in juxtaposition with the light sensor.
Figure 3:
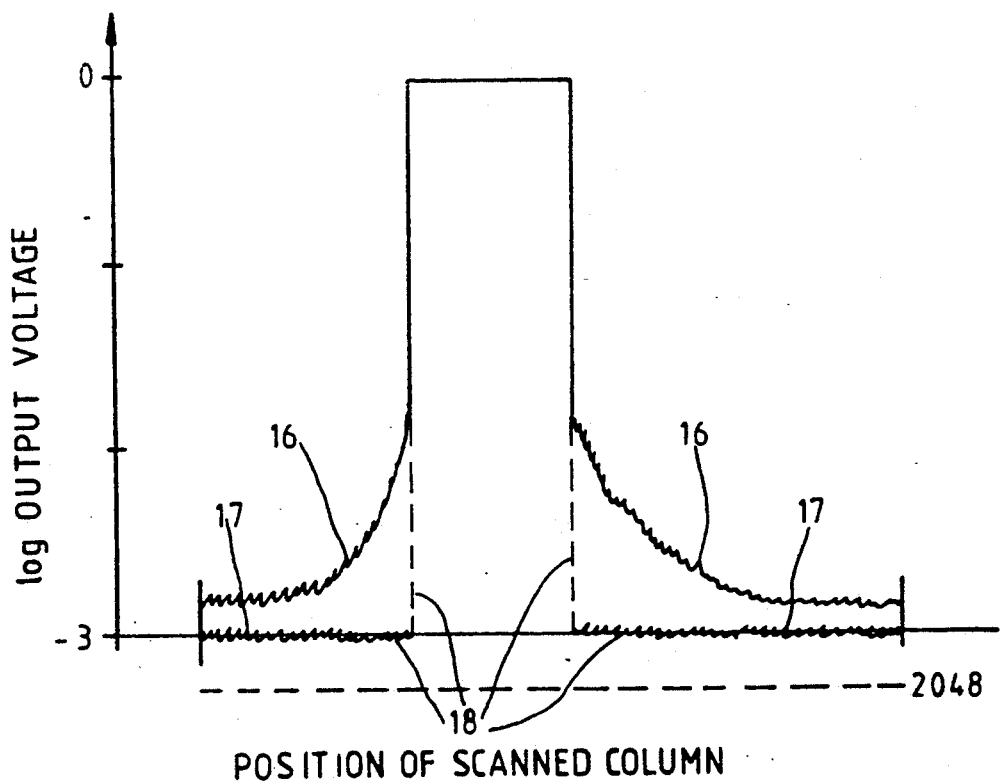
FIG. 3 is a graphical illustration of the effect of scattering in the scanner of FIG. 2.
Figure 4:
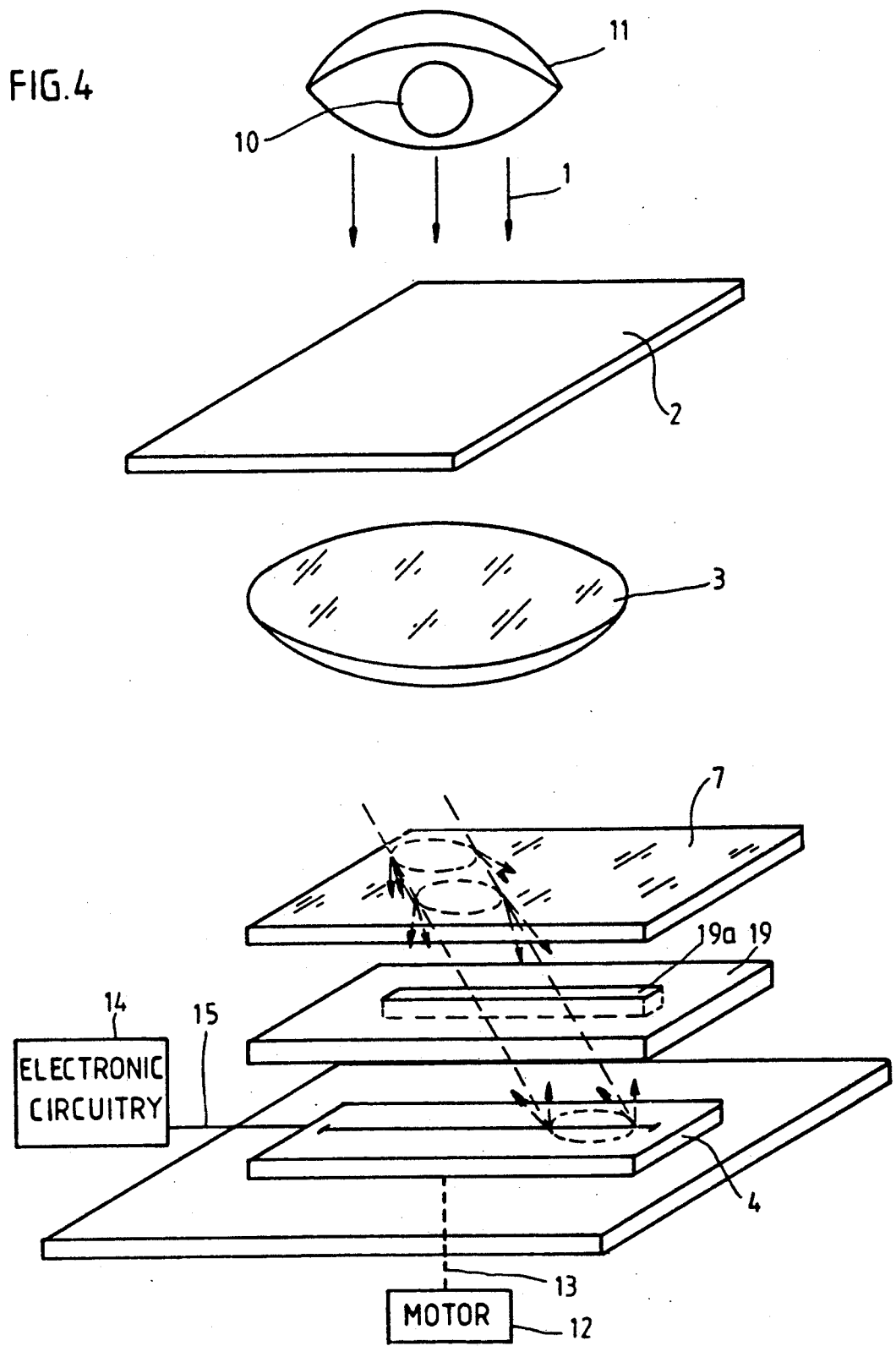
FIG. 4 is an exploded view of one embodiment of a scanner according to the invention.

FIG. 4 shows one embodiment of a scanner according to the invention for producing an image of an original, e.g., a photographic negative or diapositive. In FIG. 4, the same reference numerals as in FIGS. 1 and 2 are used to identify corresponding elements.

The scanner of FIG. 4 includes a source of electromagnetic radiation which is here constituted by a lamp 10 serving to illuminate the original 2 being scanned. A reflector 11 located behind the lamp 10 reflects the light from the latter to form the light beam 1 which travels along a predetermined path. The original 2 is disposed in the path of the light from the lamp 10 and is thus illuminated by the light beam 1. The light which passes through the original 2 is directed towards and focused on the sensor 4 by the objective 3.

The sensor 4, which comprises a semiconductor, has a single row of light sensing elements or cells as mentioned previously. During scanning of the original 2, the sensor 4 and the original 2 are moved relative to one another in a direction perpendicular to the row of sensing elements so that the sensing elements scan successive increments of the original 2 at a multiplicity of points defining a series of rows and columns. In FIG. 4, the sensor 4 is moved relative to the original 2 by means of a motor 12 which is coupled to the sensor 4 via a drive connection 13. As the original 2 is scanned, the sensing elements generate signals which represent an image of the original 2.

The scanner of FIG. 4 is electronic as schematically indicated by the electronic circuitry 14 and the conductor 15 connecting the electronic circuitry 14 to the sensor 4.

Similarly to the prior art scanner of FIG. 2, the scanner of FIG. 4 is provided with the protective sheet 7 which is again preferably made of glass. The protective sheet 7, which is transparent to the radiation from the lamp 10, is located between the objective 3 and the sensor 4. As explained with reference to the prior art scanner of FIG. 2, the protective sheet 7 produces scattered light which can affect the quality of the image obtained from the original 2.

In order to reduce the amount of scattered light which impinges upon the sensor 4, a slotted mask or stop 19 is interposed between the sensor 4 and the protective sheet 7 in the scanner of FIG. 4. The mask 19 has a pair of opposed major surfaces and is provided with a slit 19a, i.e., a narrow elongated aperture, which bridges the major surfaces. One of the major surfaces of the mask 19 is juxtaposed with the sensor 4 in such a manner that the slit 19a extends longitudinally of and parallel to, and is in register with, the row of sensing elements of the sensor 4. The mask 19 is preferably positioned as close as possible to the sensor 4. The design and disposition of the mask 19 are such as to reduce or substantially eliminate vignetting of the image of the original 2.

To adjust the mask 19 to the configuration of the rays from the lamp 10 and make the area of the slit 19a as small as possible without affecting the configuration of the rays which carry the image of the original 2, it is preferred for the slit 19a to have a trapezoidal cross section. The mask 19 is then arranged so that the area of the slit 19a decreases in a direction from the major surface of the mask 19 which faces the protective sheet 7 to the major surface which faces the sensor 4, i.e., the major surface at which the area of the slit 19a is a minimum is adjacent to the sensor 4.

The walls bounding the slit 19a are provided with matte black surfaces. Similarly, the underside of the mask 19, that is, the major surface facing the sensor 4, is matte black. The matte black surfaces of the mask 19 function to absorb scattered light.

The predominant part of the scattered light produced by the protective sheet 7 now impinges upon the slotted mask 19 while only a small fraction passes through the slit 19a to the sensor 4. Furthermore, since the dimensions of the slit 19a at the major surface of the mask 19 which is adjacent to the sensor 4 approximate or equal the dimensions of the row of sensing elements, the inactive regions of the sensor 4 are essentially completely covered by the mask 19. Accordingly, scattered light which would otherwise be reflected back to the protective sheet 7 cannot impinge upon these inactive regions. Any small amounts of scattered light which may be reflected from the sensor 4 are, for the most part, directed against the blackened underside of the mask 19 and absorbed. Only a minute part of such reflected scattered light can return to the protective sheet 7 via the narrow slit 19a and, in turn, only a small fraction of the scattered light returned to the protective sheet 7 can be reflected by the latter through the slit 19a and back to the sensor 4. The simple mask 19 thus reduces scattered light and halo formation by orders of magnitude.

Figure 5:
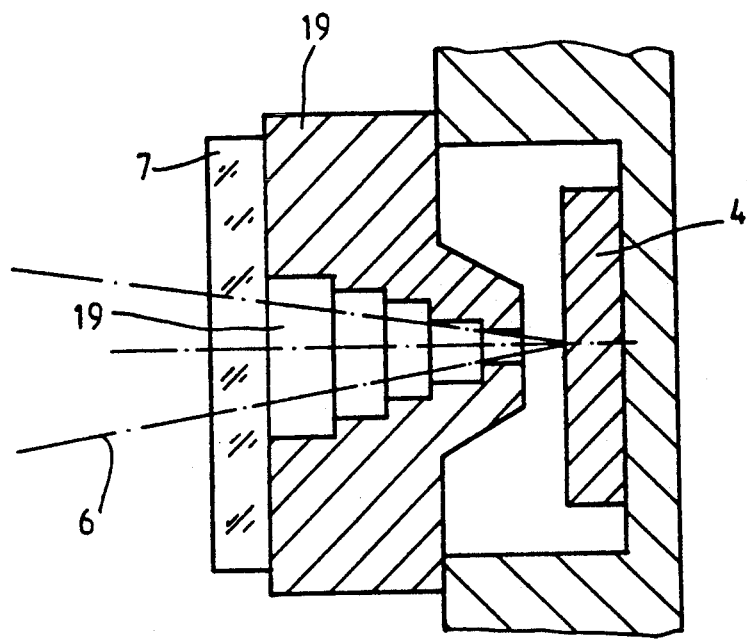
FIG. 5 is a sectional view of another embodiment of a scanner in accordance with the invention.

Another embodiment of the slotted mask 19 is shown in the enlarged sectional view of FIG. 5. Here, both of the side walls or longitudinal walls bounding the slit 19a are formed with steps in such a manner that the area of the slit 19a decreases in a direction from the surface of the mask 19 which faces the protective sheet 7 towards the surface which is adjacent to the sensor 4. The average angle of inclination of these walls depends upon the angle of convergence of the rays 6 which carry the image of the original 2 during scanning and is selected so as to just prevent vignetting of the image. The stepped design of the walls reduces the reflection of light at the walls.

Figure 6:
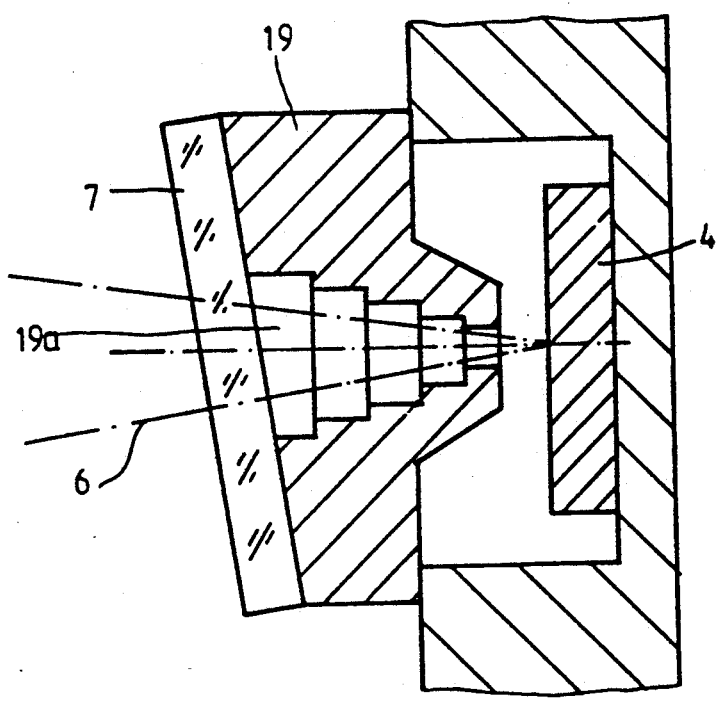
FIG. 6 is similar to FIG. 5 but shows a further embodiment of a scanner according to the invention.

A further embodiment of the scanner according to the invention is illustrated in FIG. 6 where the protective sheet 7 is inclined with respect to the optic axis or path of the rays 6 which carry the image of the original 2 during scanning. The angle of inclination of the protective sheet 7 to the optic axis or path of the rays 6 is preferably at least 10 degrees. Due to the inclination of the protective sheet 7, scattered light produced at the major surfaces of the protective sheet 7 is directed away from the optic axis or path of the rays 6. Consequently, much less scattered light can travel through the slit 19a of the mask 19 and to the sensor 4. Moreover, should light be reflected back through the slit 19a from regions of the sensor 4 surrounding the active area of the latter, then the protective sheet 7 reflects the returning light at such an angle that the light impinges upon the stepped walls of the slit 19a and is rendered harmless.

Figure 7:
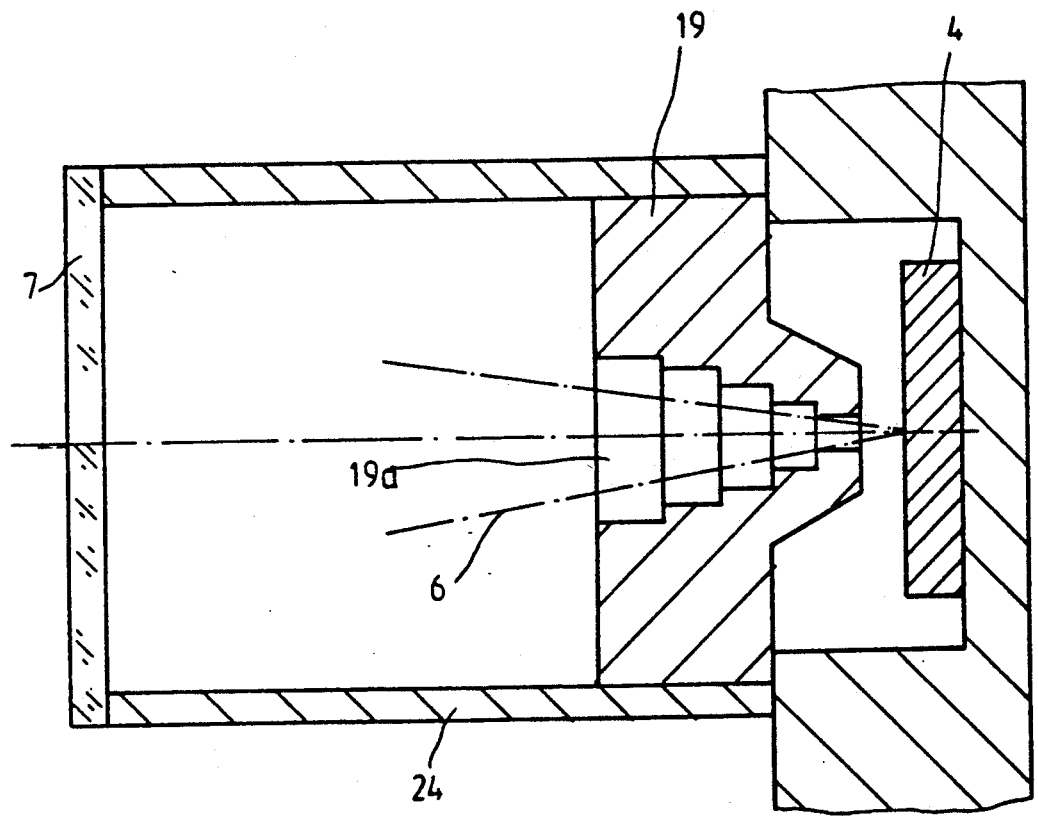
FIG. 7 is similar to FIGS. 5 and 6 but illustrates an additional embodiment of a scanner in accordance with the invention.

An additional embodiment of the scanner in accordance with the invention is shown in FIG. 7. In FIG. 7, the protective sheet 7 is spaced from the slotted mask 19 by a spacer 24. The spacer 24 is here constituted by an opaque tubular element or hollow cylinder. The length of the spacer 24 as considered in a direction from the protective sheet 7 towards the mask 19 is significantly greater than, e.g., a multiple of, the spacing between the mask 19 and the sensor 4 so that the protective sheet 7 and the mask 19 are separated by a distance which is likewise significantly greater than such spacing. By spacing the protective sheet 7 from the spacer 19 in this manner, scattered light produced by the protective sheet 7 is more diffusely distributed upon arrival at the mask 19 and thus has a much lower intensity when it passes through the slit 19a and impinges the sensor 4.

The spacer 24 can be bevelled at the end thereof proximate to the protective sheet 7 in order to position the latter at an inclination to the optic axis or path of the rays 6 which carry the image of the original 2. This allows the advantages of a spacing between the protective sheet 7 and the mask 19 to be combined with the advantages of an inclined disposition of the protective sheet 7.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A scanner for producing an image of an original located in a predetermined path, comprising a source of radiation; means for directing radiation from said source along said path, said directing means including a lens for focusing radiation which travels away from the original; a sensor including a row of sensing elements arranged to sense the focused radiation and to generate signals which represent an image of the original; and a mask between said lens and said sensor for reducing impingement of scattered radiation on said sensing elements, said mask having a pair of opposed major sides and being provided with a slit which bridges said major sides and extends longitudinally of, and is at least approximately in register with, said row, and said mask being positioned and designed to reduce vignetting of the image, said slot having a minimum area at one of said sides and said one side being juxtaposed with said sensor.

2. The scanner of claim 1, further comprising a protective sheet, which is transparent to the radiation from said source, between said lens and said mask.

3. The scanner of claim 2, wherein said sheet comprises glass.

4. The scanner of claim 1, further comprising electronic circuitry which is associated with said sensor.

5. The scanner of claim 1, further comprising means for moving the original and said sensor relative to one another.

6. The scanner of claim 1, wherein said mask has a matte black surface portion.

7. The scanner of claim 6, wherein said slit is bounded by a wall and said wall includes at least part of said surface portion.

8. The scanner of claim 6, wherein said one side of said mask includes at least part of said surface portion.

9. The scanner of claim 1, further comprising a protective sheet, which is transparent to the radiation from said source, between said lens and said mask, said sheet being inclined with respect to said predetermined path.

10. The scanner of claim 9, wherein said sheet is inclined at an angle of at least 10 degrees to said predetermined path.

11. The scanner of claim 1, further comprising a protective sheet, which is transparent to radiation from said source, between said lens and said mask, and a spacer between said sheet and said mask.

12. The scanner of claim 11, wherein said spacer comprises a tubular element.

13. The scanner of claim 11, wherein said mask is spaced from said sensor by a predetermined distance and said spacer has a length significantly greater than said predetermined distance.

14. A scanner for producing an image of an original located in a predetermined path, comprising a source of radiation; means for directing radiation from said source along said path, said directing means including a lens for focusing radiation which travels away from the original; a sensor including a row of sensing elements arranged to sense the focused radiation and to generate signals which represent an image of the original; and a mask between said lens and said sensor for reducing impingement of scattered radiation on said sensing elements, said mask being provided with a slit which extends longitudinally of, and is at least approximately in register with, said row, and said mask being positioned and designed to reduce vignetting of the image, said mask having a pair of opposed major sides and said slit bridging said major sides, said slit having a cross section such that the area of said slit decreases in a direction from one of said sides towards the other of said sides.

15. The scanner of claim 14, wherein said slit has a substantially trapezoidal cross section.

16. The scanner of claim 14, wherein said other side is juxtaposed with said sensor.

17. A scanner for producing an image of an original located in a predetermined path, comprising a source of radiation; means for directing radiation from said source along said path, said directing means including a lens for focusing radiation which travels away from the original; a sensor including a row of sensing elements arranged to sense the focused radiation and to generate signals which represent an image of the original; and a mask between said lens and said sensor for reducing impingement of scattered radiation on said sensing elements, said mask being provided with a slit which extends longitudinally of, and is at least approximately in register with, said row, and said mask being positioned and designed to reduce vignetting of the image, said mask having a pair of opposed major sides and said slit bridging said major sides, said slit being bounded by a pair of opposed longitudinal walls and at least one of said walls being stepped so that the area of said slit decreases in a direction from one of said sides towards the other of said sides.

18. The scanner of claim 17, wherein both of said walls are stepped.

19. The scanner of claim 17, wherein said other side is juxtaposed with said sensor.

* * * * *